United States Patent [19]

Tsuda et al.

[11] Patent Number: 4,707,187

[45] Date of Patent: * Nov. 17, 1987

[54] MORTAR ADMIXTURE

[75] Inventors: Kenji Tsuda; Hajime Namikoshi, both of Himeji, Japan

[73] Assignee: Daicel Chemical Industries, Ltd., Osaka, Japan

[*] Notice: The portion of the term of this patent subsequent to Nov. 17, 2004 has been disclaimed.

[21] Appl. No.: 916,242

[22] Filed: Oct. 7, 1986

Related U.S. Application Data

[63] Continuation of Ser. No. 741,977, Jun. 6, 1985, abandoned.

[30] Foreign Application Priority Data

Jun. 7, 1984 [JP] Japan ................................. 59-115514

[51] Int. Cl.$^4$ ............................................. C04B 24/38
[52] U.S. Cl. ..................................... 106/93; 106/314; 166/293
[58] Field of Search .................... 106/93, 314; 166/293

[56] References Cited

U.S. PATENT DOCUMENTS

| | | | |
|---|---|---|---|
| 3,881,552 | 5/1975 | Hessert | 166/294 |
| 4,069,869 | 1/1978 | Sandiford | 166/270 |
| 4,258,790 | 3/1981 | Hale | 166/293 |
| 4,396,433 | 8/1983 | Brandt et al. | 166/294 |
| 4,502,887 | 3/1985 | Tsuda | 106/93 |

FOREIGN PATENT DOCUMENTS

| | | | |
|---|---|---|---|
| 54-122336 | 9/1979 | Japan | 106/93 |
| 60-260456 | 12/1985 | Japan | 106/93 |

Primary Examiner—Mark L. Bell
Assistant Examiner—A. Knab
Attorney, Agent, or Firm—Flynn, Thiel, Boutell & Tanis

[57] ABSTRACT

A mortar composition comprises a mortar and a carboxymethyl hydroxyethyl cellulose (CMHEC) having a degree of substitution (DS), by carboxymethyl group per a glucose unit, of 0.7 or less and a molar substitution (MS), by ethylene oxide per a glucose unit, of 1.2 to 7.0.

2 Claims, No Drawings

MORTAR ADMIXTURE

This is a continuation of application Ser. No. 741,977, filed June 6, 1985, abandoned.

FIELD OF INDUSTRIAL APPLICATION

This invention relates to a mortar admixture, and more particularly to a mortar admixture for improving the properties of mortar such as plastering mortar, tiling mortar and a special mortar containing parlite.

In general, the plastering work for the application of mortar such as plastering mortar, tiling mortar and a parlite-containing, special mortar is done by means of trowelling. Mortar per se has, however, poor fluidity or trowellability. Accordingly, the plastering would need much labor. Further, the finished surface may be uneven depending on the skill of the plasterer. Especially in summer, mortar is drains rapidly on the groundwork and rapid work is required for its application.

In order to improve those defects and facilitate the plastering, it has been a usual practice to incorporate mortar with methylcellulose (MC), hydroxypropylmethylcellulose (HPMC), hydroxyethylmethylcellulose (HEMC) or hydroxyethylcellulose (HEC) as the admixture (see, e.g., Japanese Patent Publication No. 26928/1976 and Japanese Patent Laid-Open Nos. 22666/1981 and 155058/1981).

When mortar is mixed with a polymer of these compounds, the consistency and the water retention are increased and the trowellability and spreadability are also improved. Accordingly, a period of time required for curing and drainage is prolonged. The polymers in prior arts are therefore effective in improving the mortar greatly in workability and preventing it from cracking.

These conventional mortar admixtures have high air entrainability and introduce air bubbles into mortar so they are defective in lowering the strength of the cured product though the workability is improved.

In order to remove the above-mentioned defects, it has been attempted to incorporate mortar with a commercially available anti-foaming agent together with these admixtures, thereby controlling the air entrainment. It was found, however, that mortar had a greatly increased fluidity with decrease of an amount of the entrained air. This way, a new mortar admixture is required to decrease air entrainability and improve fluidity of mortar.

The present inventors have studied how to solve these technical problems inherent in the conventional mortar admixtures and have finally arrived at the present invention which is based on the finding that carboxymethylhydroxyethylcellulose having both anionic carboxymethyl groups and nonionic hydroxyethyl group in a specified extent of substitution, even when it is incorporated in a cement system where calcium ions are predominant, is free from gelation and can exhibit a satisfactory effect on cement dispersion, whereby the mortar is improved in fluidity and yet air entrainment is controlled.

SUMMARY OF THE INVENTION

The invention relates to a mortar composition which comprises a mortar and a carboxymethyl hydroxyethyl cellulose (CMHEC) having a degree of substitution (DS), by carboxymethyl group per anhydroglucose unit, of 0.7 or less and a molar substitution (MS), by ethylene oxide per anhydroglucose unit, of 1.2 to 7.0. A degree of substitution is defined also as an extent of substitution. In addition, the invention provides a mortar admixture of the above defined CMHEC.

The carboxymethylhydroxyethylcellulose used in this invention can be prepared according to known methods (e.g., those described in U.S. Pat. Nos. 2,618,632 and 3,446,795 and Japanese Patent Laid-Open No. 18586/1973), by converting a cellulose into an alkaline cellulose, carboxymethylating it with monochloroacetic acid and reacting the product with ethylene oxide for hydroxyethylation, or alternatively by first hydroxyethylating an alkaline cellulose with ethylene oxide and reacting the product with monochloroacetic acid for carboxymethylation. The obtained product has a carboxymethyl group which is in the form of an alkali metal salt, normally a sodium salt.

The greater the DS of the carboxymethyl groups in CMHEC, the smaller the air entrainment in the mortar incorporated therewith. If the DS is greater than 0.7, however, the fluidity of the mortar will be lowered; in contrast, if it is smaller than 0.01, the inhibitory effect on air entrainment will be reduced to nearly zero. Accordingly, a suitable DS value for a mortar admixture should be in a range of 0.01 to 0.7.

If the CMHEC has hydroxyethyl groups in a smaller MS value than 1.2, the effect of cement dispersion will be lowered, so that the mortar will have a decreased fluidity. In contrast, if the MS is greater than 7.0, the air entrainment will be too great, and the cured product will have a low strength. Accordingly, a suitable MS of hydroxyethyl groups should be in a range of 1.2 to 7.0.

A suitable viscosity of the CMHEC used in this invention should be in a range of 50 cps and 7,000 cps in terms of a 1% aqueous solution at 25° C. The amount of the CMHEC added should be 0.05 to 1.0 part by weight per 100 parts by weight of a mortar. When a content of the admixture is lower than 0.05 parts, the resulting mortar composition will not be effectively provided with enough fluidity, water retention and plasticity. When a content thereof is higher than 1.0 part, it will be too viscous and stick to the trowel. Moreover, the mortar would cure only at the surface thereof and, as a result, the surface finish would be difficult to work with a trowel.

The mortar admixture comprising the CMHEC as the chief ingredient in this invention may further be incorporated, if necessary, with various assistants which are generally used to improve the properties of mortar. The assistants for this purpose include water reducing admixtures such as ligninsulfonates, high-molecular aromatic sulfonates, polycyclic aromatic sulfonates, melaminesulfonates, hydroxycarboxylates and highly condensed triazinesulfonates, setting accelerators such as calcium chloride, sodium aluminate and calcium formate, and antifoaming agents such as dibutyl phthalate, water-insoluble alcohols, tributyl phosphate and silicone.

This invention will now be illustrated by the following examples and comparative examples.

EXAMPLE

A mixture of 600 g of Portland cement, 300 g of water and 1,200 g of river sand, incorporated with 0.6 or 1.8 g of the admixture, was kneaded according to the method of JIS R-5201. An air content in the resulting fresh mortar was calculated from specific gravity, and the fluidity of the mortar was determined according to the testing method for "workability" as stipulated in the Japan Housing Public Corporation's "Quality Identification Standard for Plasterer's Mortar Admixture (draft)," by observing the depth of penetration of a 2.0 kg plunger into mortar.

Table 1 shows the testing results observed on mortar incorporated with the CMHEC varying in DS values of carboxymethyl groups and MS values of hydroxyethyl groups, commercially available hydroxypropylmethylcellulose (Metholose 90SH-30000, a tradename of Shin-Etsu Chemical Industry Co., Ltd.), and the same cellulose incorporated with a commercially available anti-foaming agent (SN Defoamer 24-FP, a product of Sun Nopco Co.), respectively.

It is evident from Table 1 that the mortar incorporated with the commercially available HPMC alone had a high entrained air content, and that although said content could be controlled by adding the anti-foaming agent, the mortar had its fluidity decreased gravity as observed by the depth of penetration.

In contrast, the mortar incorporated with the admixture comprising the CMHEC, wherein the DS of carboxymethyl groups was at most 0.7 and the MS of hydroxymethyl groups was 1.2 to 7.0, had a superior fluidity as evident from its low air content, which was lower than 10%, and a penetration of more than 60 mm.

In Table 1, each example and comparative example is classfied in terms of general evaluation by summing up the test results as mentioned above. A mark of double circles indicates "excellent"; a mark of a single circle means "good" and a mark of "x" shows "not improved".

The embodiments of the invention in which an exclusive property or privilege is claimed are defined as follows:

1. A mortar composition, consisting essentially of:
   mortar consisting essentially of hydraulic inorganic cement, water and fine aggregate; and
   from 0.05 to 1.0 part by weight of carboxymethylhydroxyethylcellulose (CMHEC), per 100 parts by weight of said mortar for improving the trowellability and spreadability of the mortar, said CMHEC having a carboxymethyl degree of substitution of from 0.01 to 0.7 per anhydroglucose unit, said CMHEC having an ethylene oxide molar substitution of 3.10 to 4.65 per anhydroglucose unit, a 1% aqueous solution of said CMHEC having a viscosity of 50 to 7000 cps, at 25° C.

2. A mortar composition as claimed in claim 1 in which said 1% aqueous solution of said CMHEC has a viscosity of 212 to 1286 cps, at 25° C.

* * * * *

TABLE 1

| No. | Admixture | | | | | Physical properties of fresh mortar | | General evaluation |
| | Material | DS | MS | Viscosity of 1% solution at 25° C. (cps) | Content (%/cement) | Air content (%) | Depth of penetration (mm) | |
| --- | --- | --- | --- | --- | --- | --- | --- | --- |
| Example | | | | | | | | |
| 1 | CMHEC | 0.43 | 1.25 | 220 | 0.1 | 1.8 | 65 | ○ |
| 2 | " | 0.31 | 2.50 | 1286 | " | 1.2 | 90 | ◎ |
| 3 | " | 0.64 | 2.50 | 968 | " | 1.7 | 69 | ○ |
| 4 | " | 0.26 | 3.10 | 364 | " | 2.8 | 110< | ◎ |
| 5 | " | 0.09 | 3.20 | 398 | " | 5.8 | 110< | ◎ |
| 6 | " | 0.38 | 3.40 | 212 | " | 3.2 | 110< | ◎ |
| 7 | " | 0.48 | 4.65 | 443 | " | 4.5 | 110< | ◎ |
| 8 | " | 0.31 | 2.50 | 457 | 0.3 | 5.4 | 92 | ◎ |
| 9 | " | 0.38 | 3.40 | 212 | 0.3 | 8.2 | 110< | ◎ |
| Comparative Example | | | | | | | | |
| 10 | " | 0.83 | 1.59 | 818 | 0.1 | 2.2 | 15 | X |
| 11 | " | 1.27 | 1.86 | 435 | " | 2.2 | 48 | X |
| 12 | " | 0.82 | 3.03 | 415 | " | 1.6 | 26 | X |
| 13 | HPMC | | | | 0.1 | 15.2 | 95 | X |
| 14 | HPMC + anti-foamer | | | | 0.1 0.04 | 1.5 | 45 | X |